US 8,055,831 B2

(12) United States Patent  
Choi et al.

(10) Patent No.: US 8,055,831 B2  
(45) Date of Patent: Nov. 8, 2011

(54) COMPUTER SYSTEM FOR SUPPLYING ELECTRIC POWER TO EXTERNAL APPARATUS AND CONTROL METHOD THEREOF

(75) Inventors: Byung-goo Choi, Suwon-si (KR); Ja-goun Koo, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 437 days.

(21) Appl. No.: 12/329,004

(22) Filed: Dec. 5, 2008

(65) Prior Publication Data

US 2009/0271650 A1    Oct. 29, 2009

(30) Foreign Application Priority Data

Apr. 24, 2008    (KR) .................. 10-2008-0038409

(51) Int. Cl.  
G06F 1/26    (2006.01)
(52) U.S. Cl. ........................... 710/313; 713/300
(58) Field of Classification Search .................. 710/313; 713/300, 310  
See application file for complete search history.

(56) References Cited

U.S. PATENT DOCUMENTS

| | | | |
|---|---|---|---|
| 6,648,695 B1 | 11/2003 | Wu | |
| 6,881,098 B2 * | 4/2005 | Jeansonne et al. | 439/638 |
| 7,310,697 B2 * | 12/2007 | Pandit et al. | 710/313 |
| 7,793,118 B2 * | 9/2010 | Ho et al. | 713/300 |
| 2008/0122292 A1 * | 5/2008 | Minami | 307/44 |
| 2009/0079264 A1 * | 3/2009 | Minami | 307/44 |
| 2009/0313412 A1 * | 12/2009 | Huang | 710/313 |

FOREIGN PATENT DOCUMENTS

KR    20-0335163  Y1    12/2003

* cited by examiner

Primary Examiner — Glenn A Auve  
(74) Attorney, Agent, or Firm — Jefferson IP Law, LLP

(57) ABSTRACT

A computer system includes multiple ports to which at least one external device is connected and which are connectable to multiple power supplying lines branched from a power supplying line for supplying electric power to the at least one external device; a switching unit which controls connections between the power supplying lines and the ports; and a controller which controls the switching unit so that two or more power supplying lines among the power supplying lines are connected to a first port, to which one of the at least one external device is connected, among the ports.

28 Claims, 5 Drawing Sheets

COMPUTER SYSTEM FOR SUPPLYING ELECTRIC POWER TO EXTERNAL APPARATUS AND CONTROL METHOD THEREOF

CROSS-REFERENCE TO RELATED APPLICATION

This application claims priority from Korean Patent Application No. 2008-38409, filed on Apr. 24, 2008 in the Korean Intellectual Property Office, the disclosure of which is incorporated herein by reference.

BACKGROUND OF THE INVENTION

1. Field of the Invention

Aspects of the present invention relate to a computer system and a control method thereof, and more particularly, to a computer system with a plurality of ports to which external devices are mounted and from which the external devices can draw electric power, and a control method thereof.

2. Description of the Related Art

A computer system (such as a desktop computer, a laptop computer, or the like) includes various ports for interfaces with internal or external devices. As a representative example of the ports, there is a universal serial bus (USB) port. FIG. 1 is a block diagram of a conventional computer system 10 with a USB port. The computer system 10 includes a central processing unit 11, an input/output control hub (ICH) 13 for input/output control of peripheral units, and a memory control hub (MCH) 12 for memory control. Further, the computer system 10 includes a plurality of USB ports 14 and 15, to which a corresponding external device 21 is mounted according to a USB standard.

Each of the USB ports 14 and 15 is connected to a power source Vcc of 5V so that the external device 21 can draw electric power therefrom. Specifically, as shown in FIG. 1, power terminals PWR1 and PWR2 of the USB ports 14 and 15 are connected to power supplying lines 17 and 18 branched from the power source Vcc, respectively. The computer system 10 includes a power switch 16 to cut off an overcurrent when the overcurrent flows in the power supplying lines 17 and 18, thereby preventing element damage, fire, etc.

Meanwhile, the USB specification, such as USB Specification 2.0, describes that the USB ports 14 and 15 each is provided with a direct current (DC) power of 5V and a current of 500 mA. Thus, the computer system 10 has a power configuration designed in consideration of this specification.

However, an external device 21 that needs an electric power of 500 mA or more has recently come out as the performance thereof is enhanced or for the like reasons. In this case, if the power supplying lines 17 and 18 are not designed to supply the electric power proper for the external device 21, the external device 21 may abnormally operate due to supply of insufficient electric power.

To solve this problem, there have been considered methods in which intensity of suppliable current increased per power supplying line, an additional power source is connected to the port, etc. However, these methods increase the costs of the power configuration. Further, if the connection of the additional power source depends on manipulation of a user, it brings inconvenience to a user. Also, a user may not make good use of the additional power source for lack of adequate understanding.

SUMMARY OF THE INVENTION

It is an aspect of the present invention to provide a computer system capable of supplying sufficient electric power to an external apparatus mounted to a port thereof with low costs, and a control method of the same.

Another aspect of the present invention is to provide a computer system capable of supplying sufficient electric power to an external apparatus mounted to a port thereof with high reliability and convenience, and a control method of the same.

An aspect of the present invention can be achieved by providing a computer system including: a plurality of ports to which at least one external device is mounted and which is connectable to a plurality of power supplying lines branched from a power supplying line for supplying electric power to the at least one external device; a switching unit which controls connections between the plurality of power supplying lines and the plurality of ports; and a controller which controls the switching unit so that two or more power supplying lines among the plurality of power supplying lines are connected to a first port, to which one of the at least one external device is being mounted, among the plurality of ports.

According to an aspect of the present invention, the controller may determine whether the at least one external device is lacking in electric power on the basis of registered information about the at least one external device, managed by an operating system of the computer system.

According to an aspect of the present invention, the controller may select a power supplying line connected to a second port, to which the at least one external device is not being mounted, among the plurality of power supplying lines, as at least one of the two or more power supplying lines to be connected to the first port.

According to an aspect of the present invention, the controller may control the switching unit so that the two or more power supplying lines are additionally connected to the first port at least one by one.

According to an aspect of the present invention, the controller may give a user a message of asking him/her to remove the at least one external device being mounted to other ports among the plurality of ports than the first port.

According to an aspect of the present invention, the controller may disconnect at least one of the two or more power supplying lines and the first port if the at least one external device is removed from the first port.

According to an aspect of the present invention, the switching unit may include: a plurality of switching elements which controls connections between the plurality of second power supplying lines and the plurality of ports; and a switching driver which may drive the plurality of switching elements on the basis of a control signal.

According to an aspect of the present invention, the controller may include: an input/output controller which outputs the control signal to the switching driver; and a program executer which executes a computer program so that the input/output controller outputs the control signal.

According to an aspect of the present invention, the foregoing and/or other aspects of the present invention can be achieved by providing a method of controlling a computer system, including: selecting a first port among a plurality of ports to which at least one external device is mounted and which is connectable to a plurality of power supplying lines branched from a power supplying line for supplying electric power to the at least one external device; and connecting two or more power supplying lines among the plurality of power supplying lines to the first port, to which one of the at least one external device is being mounted.

According to an aspect of the present invention, the selecting of the first port includes determining whether the at least one external device is lacking in electric power on the basis of registered information about the external device, managed by an operating system of the computer system.

According to an aspect of the present invention, the method further includes selecting a power supplying line connected to a second port, to which the at least one external device is not being mounted, among the plurality of power supplying lines, as at least one of the two or more power supplying lines to be connected to the first port.

According to an aspect of the present invention, the connecting of the two or more power supplying lines may include additionally connecting the two or more power supplying lines to the first port at least one by one.

According to an aspect of the present invention, the method further includes giving a user a message of asking him/her to remove the at least one external device being mounted to other ports among the plurality of ports than the first port.

According to an aspect of the present invention, the method further includes disconnecting at least one of the two or more power supplying lines and the first port if the at least one external device is removed from the first port.

An aspect of the present invention can be achieved by providing a computer system including: a plurality of ports to which at least one external device is mounted and which is connectable to a plurality of power sources for supplying electric power to the at least one external device; a switching unit which controls connections between the plurality of power sources and the plurality of ports; and a controller which controls the switching unit so that two or more power sources among the plurality of power source are connected to the port, to which one of the at least one external device is being mounted, among the plurality of ports if the at least one external device being mounted to one of the plurality of ports is lacking in the electric power.

According to an aspect of the present invention, the controller may determine whether the at least one external device is lacking in electric power on the basis of registered information about the at least one external device, managed by an operating system of the computer system.

An aspect of the present invention can be achieved by providing a method of controlling a computer system, including: selecting a first port among a plurality of ports to which at least one external device is mounted and which is connectable to a plurality of power sources for supplying electric power to the at least one external device; and connecting two or more power sources among the plurality of power sources to the first port, to which one of the at least one external device is being mounted, among the plurality of ports.

According to an aspect of the present invention, the selecting of the first port may include determining whether the at least one external device is lacking in electric power on the basis of registered information about the at least one external device, managed by an operating system of the computer system.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
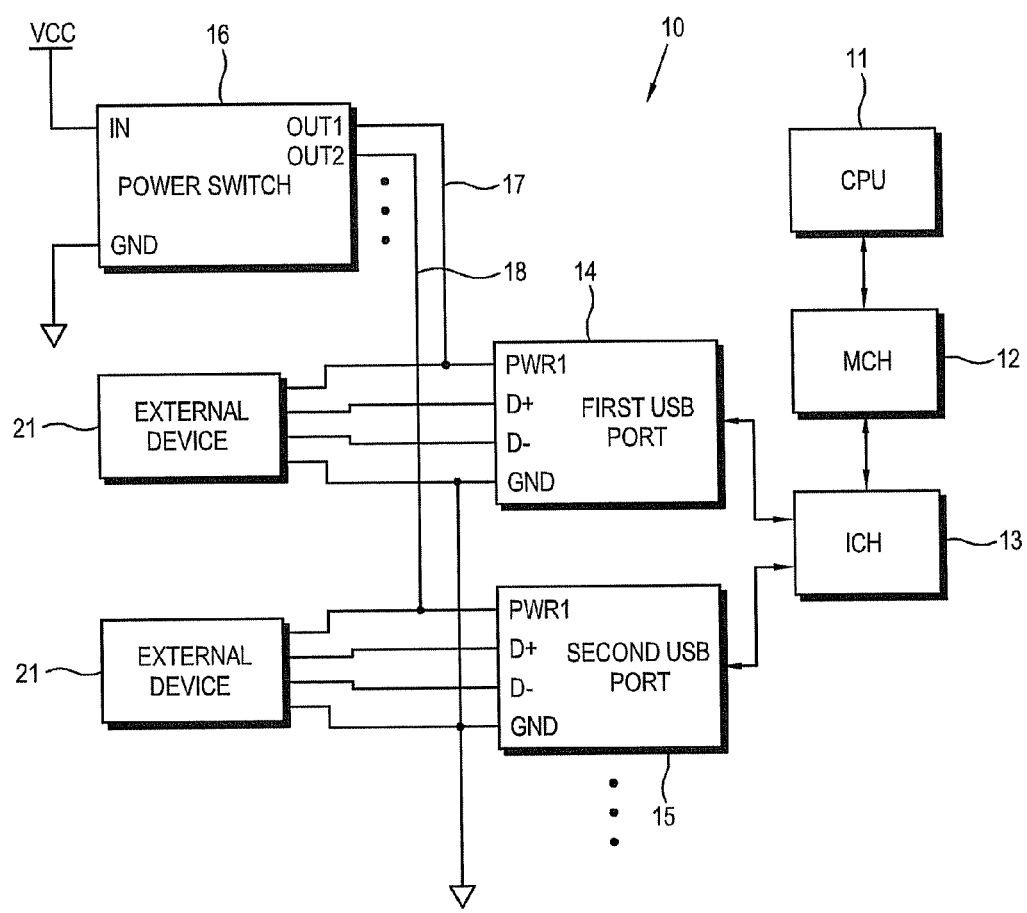
FIG. 1 is a block diagram of a conventional computer system with a universal serial bus (USB) port.

Reference will now be made in detail to the present embodiments of the present invention, examples of which are illustrated in the accompanying drawings, wherein like reference numerals refer to the like elements throughout. The embodiments are described below in order to explain the present invention by referring to the figures. The present invention may be embodied in various forms without being limited to the embodiments set forth herein. Descriptions of well-known parts are omitted for clarity, and like reference numerals refer to like elements throughout.

Figure 2:
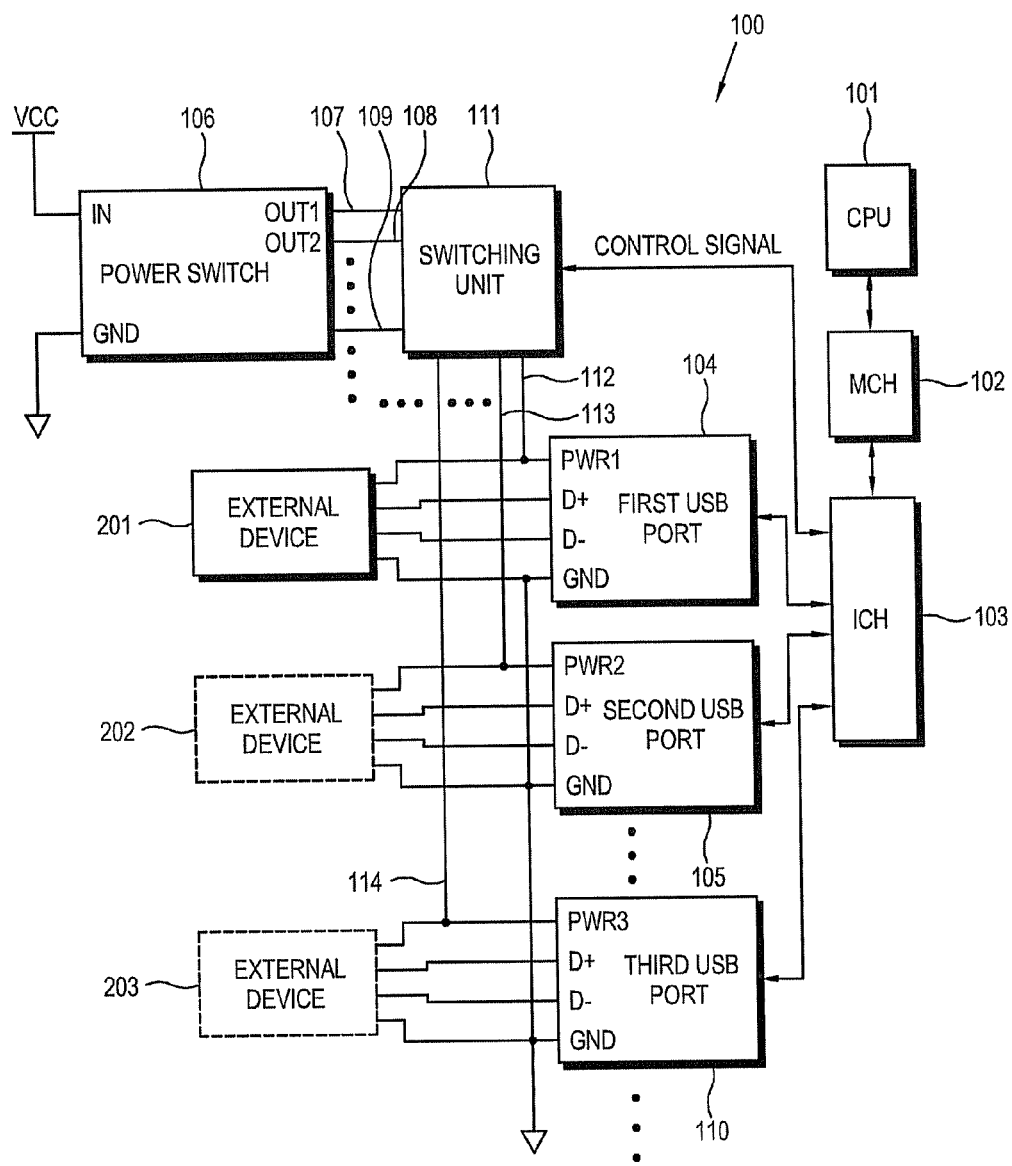
FIG. 2 is a block diagram of a computer system according to an embodiment of the present invention.

FIG. 2 is a block diagram of a computer system 100 according to an embodiment of the present invention. The computer system 100 may be realized as a desktop computer, a laptop computer, a portable media player, a personal digital assistant, a smart phone, or other like device connectable to peripheral units. The computer system 100 includes a central processing unit 101, an input/output control hub (ICH) 103 for input/output control of peripheral units, and a memory control hub (MCH) 102 for memory control.

For interfaces with corresponding external devices 201, 202 and 203, the computer system 100 includes a plurality of universal serial bus (USB) ports 104, 105 and 110 to which the external devices 201, 202 and 203 may be mounted. In this embodiment, only three ports, e.g., a first USB port 104, a second USB port 105 and a third USB port 110 are shown for convenience, but the invention is not limited thereto. Alternatively, more or less than three ports may be provided in the computer system 100, and additional non-USB ports can be used in addition to the shown ports, including ports which do not requires power supplied from the computer system 100.

Hereinafter, if not mentioned specifically, the "USB ports 104, 105 and 110" indicate all or some USB ports not shown but providable, which include the first USB port 104, the second USB port 105 and the third USB port 110. Likewise, if not mentioned specifically, the "external devices 201, 202 and 203" indicates all or some external devices not shown but providable, which include a first external device 201, a second external device 202 and a third external device 203. As such, the invention is not limited to the shown number of devices and ports, which can be more than or fewer than the shown those depicted in the example described herein. While not limited thereto, in the shown example, the external device 201 corresponds to the USB port 104, the external device 202 corresponds to the USB port 105, and the external device 203 corresponds to the USB port 110. However, only the external device 201 is connected to the USB port 104, whereas the external devices 202, 203 have not been connected to the USB ports 105, 110.

Each of the USB ports 104, 105 and 110 are connected to a power source Vcc in order to supply electric power to the external devices 201, 202 and 203. In detail, as shown in FIG. 2, first power supplying lines 107, 108 and 109 branch from the power source Vcc and are connected to second power supplying lines 112, 113 and 114, respectively. The second power supplying lines 112, 113 and 114 are connected to the corresponding power terminals PWR1, PWR2 and PWR3 of the USB ports 104, 105 and 110. While not limited thereto, in the shown example, the second power supplying line 112 is connected to the corresponding power terminal PWR1 of the USB port 104, the second power supplying lines 113 is connected to the corresponding power terminal PWR2 of the USB port 105, and the second power supplying line 114 is connected to the corresponding power terminal PWR3 of the USB port 110.

For convenience, the first power supplying lines 107, 108 and 109 and the second power supplying lines 112, 113 and 114 are illustrated only corresponding to the USB ports 104, 105 and 110. The computer system 100 may be provided with the first power supplying lines and the second power supplying lines corresponding to the not-shown USB ports or non USB ports requiring power. Similarly, if not mentioned specifically, the "first power supplying lines 107, 108 and 109" and the "second power supplying lines 112, 113 and 114" may indicate all or some power supplying lines not shown as well as the shown lines 107, 108, 109, 112, 113, 114.

Further, the shown computer system 100 includes a power switch 106 to cut off an overcurrent when the overcurrent flows in the first power supplying lines 107, 108 and 109, thereby preventing element damage, fire, etc. However, it is understood that the power switch 106 is not required in all aspects.

The computer system 100 additionally includes a switching unit 111 to selectively connect the first power supplying lines 107, 108 and 109 with the second power supplying lines 112, 113 and 114. The switching unit 111 selectively connects the first power supplying lines 107, 108 and 109 with the second power supplying lines 112, 113 and 114 on the basis of an input control signal.

Figure 3:
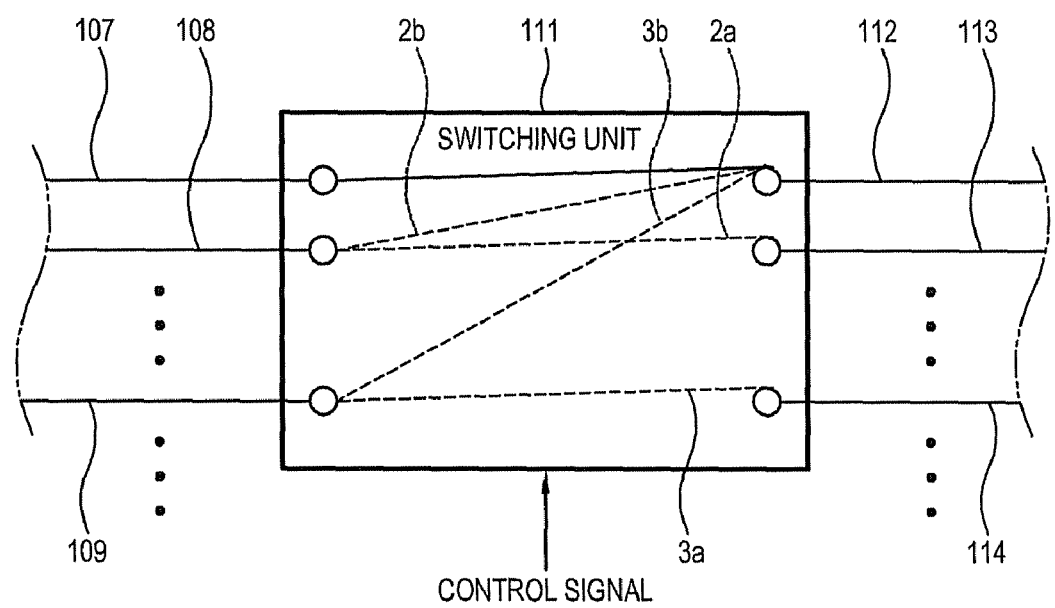
FIG. 3 illustrates operations of a switching unit according to an embodiment of the present invention.

FIG. 3 illustrates operations of the switching unit 111 according to an embodiment of the present invention. The switching unit 111 connects at least one of the first power supplying lines 107, 108 and 109 with one of the second power supplying lines 112, 113 and 114 on the basis of an input control signal. For example, as shown in FIG. 3, it may be considered that the first power supplying line 107 and the second power supplying line 112 are connected corresponding to the first USB port 104; the first power supplying line 108 and the second power supplying line 113 are connected corresponding to the second USB port 105; and the first power supplying line 109 and the second power supplying line 114 are connected corresponding to the third USB port 110 (refer to connection 2a and connection 3a of FIG. 3).

On the basis of the input control signal from the ICH 103 (see FIG. 2), the switching unit 111 may connect the first power supplying line 108 corresponding to the second USB port 105 and/or the first power supplying line 109 corresponding to the third USB port 110 with the second power supplying line 112 corresponding to the first USB port 104 (refer to connection 2b and/or connection 3b of FIG. 3). In this case, the switching unit 111 may disconnect the first power supplying line 108 from the second power supplying line 113 and/or the first power supplying line 109 from the second power supplying line 114. Thus, the electric power supplied via the first power supplying line 108 and/or the first power supplying line 109 may be supplied to the external device 201 connected to the first USB port 104 through the second power supplying line 112. As compared with one first power supplying line 107, one or more first power supplying lines 107, 108 and 109 can supply relatively high electric power (i.e., high intensity of current) to the external device 201, thereby supplying sufficient electric power to the external device 201 that needs the high current or high power.

Figure 4:
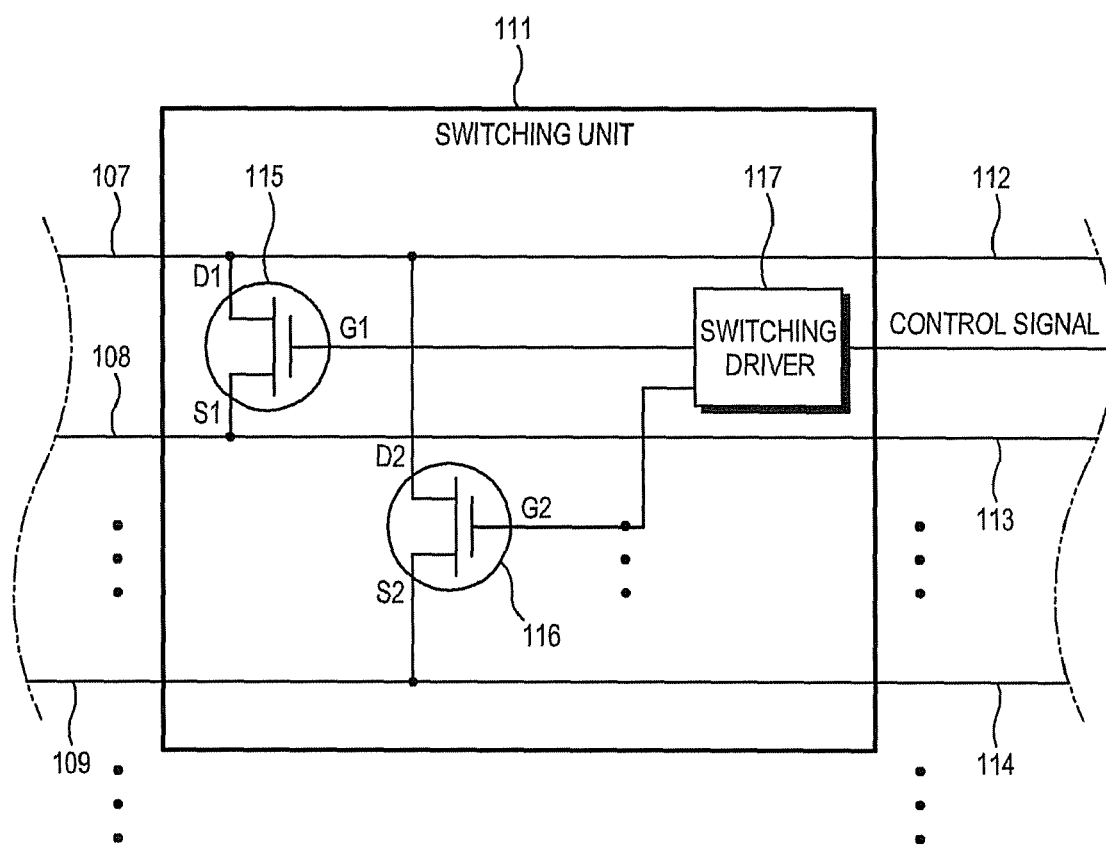
FIG. 4 illustrates an example of a configuration of the switching unit of FIGS. 2 and 3.

FIG. 4 illustrates a configuration of the switching unit 111 of FIGS. 2 and 3. The switching unit 111 may be achieved in the form of a single integrated chip (IC). As shown, the switching unit 111 includes a plurality of switching elements 115 and 116 (refer to FIG. 4) and a switching driver 117. In this embodiment, the first power supplying lines 107, 108 and 109 and the second power supplying lines 112, 113 and 114 are one to one connected, respectively.

Each of the switching elements 115 and 116 is provided in a pair of power supplying lines among the first power supplying lines 107, 108 and 109 or the second power supplying lines 112, 113 and 114, and controls the connection there between. That is, the plurality of switching elements 115 and 116 have drains D1 and D2 and source S1 and S2 connected to the pair of power supplying lines concerned, respectively. For convenience, the plurality of switching elements 115 and 116 are illustrated only corresponding to the first power supplying lines 107, 108 and 109 and the second power supplying lines 112, 113 and 114. While not limited thereto, the switching element 115 has the ground G1 connected to the switching driver 117, the drain D1 connected to the first power supplying line 107, and the source S1 connected to the first power supplying line 108. The switching element 116 has the ground G2 connected to the switching driver 117, the drain D2 connected to the first power supplying line 107, and the source S2 connected to the first power supplying line 109. The switching driver 117 controls voltages applied to gates G1 and G2 of the plurality of switching elements 115 and 116, thereby driving the plurality of switching elements 115 and 116 so as to selectively connect the power supplying lines 108, 109 to the second power supplying line 112. While not required in all aspects, like switching elements can connect other second power supplying lines to the first power supplying lines.

According to another embodiment of the present invention, the switching unit 111 may include at least one switching element (not shown) provided between the first power supplying lines 107, 108 and 109 and the corresponding second power supplying lines 112, 113 and 114, and the switching driver 117 may drive the switching element. Thus, the first power supplying lines 107, 108 and 109 and the corresponding second power supplying lines 112, 113 and 114 may be disconnected.

Below, the control signal input to the switching unit 111 will be described in more detail. In the embodiment as shown in FIG. 2, the control signal is generated by the CPU 101, the MCH 102 and the ICH 103. The ICH 103, which is an input/output controller, generates and outputs the control signal corresponding to a command of the CPU 101. The CPU 101, which is a program executer, executes a computer program and controls the ICH 103 to generate a corresponding control signal.

The computer program and software executed by the CPU 101 is stored in a computer readable medium such as nonvolatile memory (not shown) such as a hard disk drive, and all or some computer programs stored in a read only memory (ROM) are temporarily loaded to a volatile memory such as a random access memory (RAM) so as to be read by the CPU 101. The computer program loaded to the volatile memory may be read by the MCH 102. The computer program executed by the CPU 101 includes a basic input/output system (BIOS), an operating system such as Windows (registered trademark), and application programs.

As described above, the combination of the CPU 101, the MCH 102, the ICH 103, the nonvolatile memory, the volatile memory, and the computer program to be executed by the CPU 101 may be employed as an example of a controller according an embodiment of the present invention. Hereinafter, these configurations will refer to the "controller 101, 102 and 103".

In this embodiment, if the external devices 201, 202 and 203 mounted to the USB ports 104, 105 and 110 draw insufficient electric power therefrom, the controller 101, 102 and 103 generates the control signal so that two or more power supplying lines among the first power supplying lines 107, 108 and 109 are connected to one of the USB ports 104, 105 and 110 to which the external devices 201, 202 and 203 are mounted.

For example, if the external device 201 is connected to the first USB port 104 among the USB ports 104, 105 and 110 and is lacking in the electric power, the first power supplying line 108 and/or 109 corresponding to the second USB port 105 and/or the third USB port 110 may be additionally connected to the second power supplying line 112 corresponding to the first USB port 104 (refer to 2b and/or 3b of FIG. 3). As such, the controller 101,102,103 selectively connects plural first power supplying lines 107, 108, 109 to one of the second power line 112, 113, 114 of one of the USB ports 104,105, 106.

In this embodiment, the controller 101, 102 and 103 may determine whether the external device 201, 202 and 203 draws electric power sufficiently or insufficiently on the basis of registered information of the external device 201, 202 and 203, managed by the operating system of the computer system 100.

For example, if the operating system is WINDOWS, whether the external device 201, 202 and 203 draws electric power sufficiently or insufficiently is determined depending on information about the external device 201, 202 and 203 registered in "Device Manager". In more detail, when the first external device 201 is mounted to the first USB port 104, it is sensed by Plug-and-Play that the first external device 201 is connected to the first USB port 104 and it is checked whether there is information about the first external device 201 registered in "Device Manager". If there is information about the first external device 201 registered in "Device Manager", it is determined that the first external device 201 draws the electric power sufficiently since the first external device 201 is newly connected and draws enough power to be recognized by the computer system 100 as usable by the operating system. If there is no information about the first external device 201 registered in "Device Manager", it is determined that the first external device 201 draws the electric power insufficiently since the first external device 201 is newly connected but does not draw enough power to be recognized by the computer system 100 as usable by the operating system.

By way of example, whether the external device 201, 202 and 203 is lacking in the electric power may be determined at the moment when the external device 201, 202 and 203 is mounted to the USB port 104, 105 and 110. However, it is understood that this determination can be otherwise input, such as by the first external device 201 sending power status information to the operating system after mounting the first external device 201 indicates that, during usage, insufficient power is being drawn for certain functions or within a predetermined time after mounting, such that the detection need not be at the moment the external device 201, 202, 203 is mounted in all aspects of the invention.

When it is determined that there is insufficient power for the mounted first external device 201, the controller 101, 102 and 103 may select the first power supplying lines 108 and/or 109 corresponding to the idle USB ports 105 and/or 110, to which the external devices 202 and/or 203 are not mounted, among the first power supplying lines 107, 108 and 109 as the first power supplying lines 108,109 to be connected to the second power supplying line 112 in addition to the first power supplying line 107.

If the first power supplying lines 108 and/or 109 corresponding to the idle USB ports 105 and/or 110, to which the external devices 202 and/or 203 are not mounted, are not one, the controller 101, 102 and 103 may control the first power supplying lines 108 and 109 to be additionally connected to the second power supplying line 112 one by one. In other words, the electric power is gradually increased until the first external device 201 draws the electric power sufficiently from the first USB port 104.

If there is no first power supplying line to be connected to the second power supplying line under the condition that a mounted one among the external device 201, 202 and 203 is lacking in the electric power (e.g., if all USB ports 104, 105 and 110 are occupied with the external devices 201, 202 and 203) the controller 101, 102 and 103 may give a user a message of asking him/her to remove at least other one except the first external device 201 among the external devices 201, 202 and 203. To this end, the computer system 100 may include a display unit (not shown) to display such a message. However, it is understood that the first supplying lines can be chosen from USB ports connected to lower priority external devices or external devices which can be idled.

Meanwhile, if the first external device 201 is removed from the first USB port 104 after additionally connecting the first power supplying lines 108 and/or 109 (i.e., if the use of the first USB port 104 concerned is terminated) the controller 101, 102 and 103 may control the switching device 111 to release the additional connection of the first power supplying lines 108 and/or 109 so as to reconnect the USB ports 105,110 to their corresponding power supplying lines 108,109.

Figure 5:
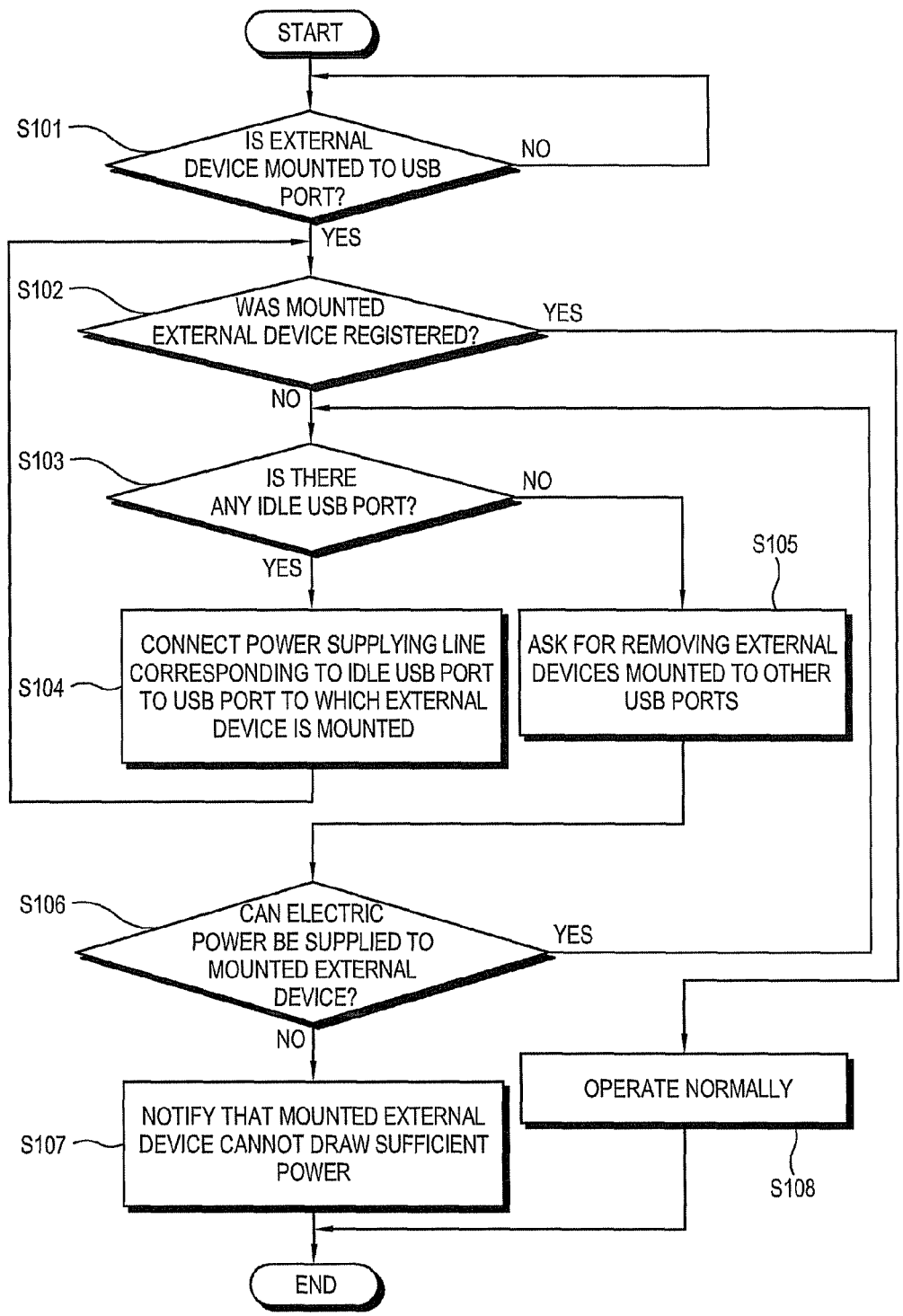
FIG. 5 is a flowchart for operations of a controller shown in FIG. 2 according to an embodiment of the invention.

Below, the operations of the controller 101, 102 and 103 will be described in detail with reference to FIG. 5. FIG. 5 is a flowchart for operation of the controller 101,102,103 shown in FIG. 2. The present embodiment is premised on the assumption that the first external device 201 needing the high current or power is connected to the first USB port 104.

First, the controller 101, 102 and 103 determines whether the external devices 201, 202 and 203 are mounted to the USB ports 104, 105 and 110 (S101). If it is determined that the first external device 201 is connected to the first USB port 104, the controller 101, 102 and 103 determines whether the first external device 201 was registered or not on the basis of the registered information of the first external device 201, managed by the operating system (S102). Such registration information indicates that the computer system 100 has recognized the first external device 201 is mounted on the computer system 100 and is usable by the computer system 100.

If it is determined that at the stage S102 the first external device 201 was registered, the controller 101, 102 and 103 determines that the first external device 201 draws the electric power sufficiently, and thus operates normally (S108).

On the other hand, if it is determined at the stage S102 that the first external device 201 was not registered (i.e., the first external device 201 has not been previously recognized by the computer system 100 even though connected to the USB port 104), the controller 101, 102 and 103 determines that the first external device 201 is lacking in the electric power, and then determines whether there are the idle USB ports 105 and/or 110 to which the external devices 201, 202 and 203 are not mounted among the USB ports 104, 105 and 110 (S103). As an alternative, it is understood that other mechanisms can be used to determine whether sufficient energy is drawn beyond reliance on registration information such that operation S102 is not limited to the shown example.

If it is determined at the stage S103 that there are the idle USB ports 105 and/or 110, the controller 101, 102 and 103 controls the switching unit 111 to connect the first power supplying line 108 and/or 109 corresponding to the idle USB ports 105 and/or 110 with the second power supplying line 112 corresponding to the first USB port 104 (S104). Then, returning back to the stage S102, the controller 101, 102 and 103 determines again whether the first external device 201 was registered. According to results, a stage following the stage S103 or the stage S108 is performed.

On the other hand, if it is determined at the stage S103 that there is no idle USB port 105 and/or 110, the controller 101, 102 and 103 may give a user a message of asking him/her to remove at least other one except the first external device 201 among the external devices 201, 202 and 203 (S105). Alternatively, the controller 101,102 and 103 can send a request to idle or sleep others of the external devices 202,203 according to a prioritized order and automatically switch the first power supplying lines without a message to a user.

Then, the controller 101, 102 and 103 finally determines whether the sufficient electric power can be supplied to the first external device 201 (S106). For example, there may be no idle USB port even though predetermined time elapses after giving the message at the stage S105. If it is determined at the stage S106 that the sufficient electric power cannot be supplied to the first external device 201, the controller 101, 102 and 103 notifies a user of the reason (S107). Here, the display unit (not shown) may be used to display the message at the stage S105.

On the other hand, if it is determined at the stage S106 that the sufficient electric power can be supplied to the first external device 201, the controller 101, 102 and 103 determines, returning back to the stage S103, whether there are the idle USB ports 105 and/or 110 to which the external devices 202 and 203 are not mounted, and performs the stage following the stage S104 or the stage S105 according to results.

The present invention is not limited to the particular specification of the ports and the USB ports are described as a representative port in the foregoing embodiment. Alternatively, the present invention may be applied to any port to which the external device can be mounted and from which the external device can draw electric power, and the ports need not be of the same specification and can be mixtures of specifications (e.g., a USB 1.0 port, a USB 2.0 port, an IEEE 1394 port etc.).

Further, as an alternative to the embodiment of FIG. 5, at least one stage may be omitted among the stages S105, S106 and S107, and the stages S105 and S106 may be interchanged with each other. Further, in the state that the first power supplying lines 108 and/or 109 are additionally connected, if the first external device 201 is removed from the first USB port 104, an operation of releasing the additional connection of the first power supplying lines 108 and/or 109 may be performed instead of the stage S108.

Also, the first power supplying lines 107, 108 and 109 branched from the power source Vcc and the corresponding second power supplying lines 112, 113 and 114 are described exemplarily, but not limited thereto. Alternatively, the present invention may be applied to a power source unit capable of independent power supply.

As described above, the present invention provides a computer system capable of supplying sufficient electric power to an external apparatus mounted to a port thereof with low costs, and a control method of the same.

Further, the present invention provides a computer system capable of supplying sufficient electric power to an external apparatus mounted to a port thereof with high reliability and convenience, and a control method of the same.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer system comprising:
    a plurality of ports connectable to corresponding detachable external devices, each of the ports being selectively connectable to a plurality of power supplying lines branched from a main power supplying line for supplying electric power to one of the external devices when connected to a first one of the ports;
    a switching unit which controls connections between the plurality of power supplying lines and the plurality of ports; and
    a controller which controls the switching unit so that two or more of the power supplying lines among the plurality of power supplying lines are connected to the first port when the one external device is mounted to jointly supply the electric power to the one external device.

2. The computer system according to claim 1, wherein the controller determines whether the one external device is lacking in electric power on the basis of whether registered information about the one external device is detected after the one external device is mounted, the registered information being managed by an operating system of the computer system.

3. The computer system according to claim 1, wherein, while a first one of the power supplying lines is connected to the first port as at least one of the two or more power supplying lines connected to the first port, the controller selects a second one of the power supplying lines connected to a second one of the ports, to which the one external device is not mounted, as at least another one of the two or more power supplying lines connected to the first port.

4. The computer system of claim 3, wherein the controller disconnects the second one of the power supplying lines from the second port while the second power supplying line is connected to the first port in addition to a first power supplying line to jointly supply the electric power to the one external device.

5. The computer system according to claim 1, wherein the controller controls the switching unit so that a second one of the two or more power supplying lines is additionally connected to the first port after a first one of the two or more power supplying lines is connected to the first port.

6. The computer system according to claim 1, wherein, when another one of the external devices is connected to a second one of the ports, the controller provides a message to a user asking the user to remove the another one external device mounted to the second port.

7. The computer system according to claim 1, wherein the controller disconnects at least one of the two or more power supplying lines from the first port when the one external device is removed from the first port.

8. The computer system according to claim 1, wherein the switching unit comprises:
    a plurality of switching elements, each of which controls a corresponding connection between one of the plurality of power supplying lines and one of the plurality of ports; and
    a switching driver which drives the plurality of switching elements according to a control signal sent from the controller to control the switching unit.

9. The computer system according to claim 8, wherein the controller comprises:
  an input/output controller which outputs the control signal to the switching driver; and
  a program executer which executes a computer program so that the input/output controller outputs the control signal.

10. The computer system of claim 1, wherein each of ports is connected to a corresponding one of the power supplying lines and is selectively disconnected from the corresponding power supplying lines according to the control of the switching unit.

11. A method of controlling a computer system, comprising:
  selecting a first port among a plurality of ports to which one external device is mounted, the first port being connectable to a plurality of power supplying lines branched from a main power supplying line for supplying electric power to the one external device and each of the ports being connectable to corresponding external devices; and
  connecting two or more power supplying lines among the plurality of power supplying lines to the first port, to which one of the at least one external device is mounted.

12. The method according to claim 11, wherein the selecting of the first port comprises determining whether the at least one external device is lacking in electric power on the basis of registered information about the external device, managed by an operating system of the computer system.

13. The method according to claim 11, further comprising, while a first one of the power supplying lines is connected to the first port as at least one of the two or more power supplying lines connected to the first port, selecting a second one of power supplying lines connected to a second port, to which the at least one external device is not mounted, among the plurality of power supplying lines, as at least one of the two or more power supplying lines to be connected to the first port.

14. The method according to claim 11, wherein the connecting of the two or more power supplying lines comprises additionally connecting the two or more power supplying lines to the first port at least one by one.

15. The method according to claim 11, further comprising giving a user a message asking the user to remove the at least one other external device mounted to other ports among the plurality of ports than the first port.

16. The method according to claim 11, further comprising disconnecting at least one of the two or more power supplying lines and the first port when the at least one external device is removed from the first port.

17. A computer system comprising:
  a plurality of ports connectable to corresponding detachable external devices, each of the ports being selectively connectable to a plurality of power sources for supplying electric power to one of the plurality of external devices when connected to a first one of the ports;
  a switching unit for controlling connections between the plurality of power sources and the plurality of ports; and
  a controller for controlling the switching unit to connect two or more power sources among the plurality of power sources connected to the first port, when the one external device is mounted, among the plurality of ports when the controller determines the one external device is lacking in the electric power.

18. The computer system according to claim 17, wherein the controller determines whether the at least one external device is lacking in electric power on the basis of registered information about the at least one external device, managed by an operating system of the computer system.

19. A method of controlling a computer system, comprising:
  selecting a first port among a plurality of ports to which at least one external device is mounted, each of the ports being selectively connectable to a plurality of power sources for supplying electric power to the at least one external device and each of the ports being connectable to corresponding external devices; and
  connecting two or more power sources among the plurality of power sources to the first port, to which one of the at least one external device is mounted, among the plurality of ports.

20. The method according to claim 19, wherein the selecting of the first port comprises determining whether the at least one external device is lacking in electric power on the basis of registered information about the at least one external device, managed by an operating system of the computer system.

21. A computer system comprising:
  an interface through which a control signal is sent to a switching unit which controls connections between a plurality of power sources and a plurality of ports; and
  a controller which detects when an external device connects to one of the ports and receives power from one of the power sources through the one port, and sends the control signal through the interface to control the switching unit to selectively connect the power sources to the one port to change a number of power sources connected to the one port in order to provide sufficient power to the external device.

22. The computer system of claim 21, wherein the controller further detects when the one port does not provide sufficient power to the external device using less than all of the plurality of power sources, and sends the control signal through the interface to control the switching unit to connect at least one additional power source among the plurality of power sources to the one port to increase the number of power sources connected to the one port in order to provide sufficient power to the external device.

23. The computer system of claim 22, wherein the controller detects when the one port does not provide sufficient power when an operating system of the computer system does not detect the external device in a Device Manager.

24. The computer system of claim 22, wherein the controller further sends the control signal to the switching unit to further disconnect the at least one additional power source from another one of the plurality ports to which the one additional power source was previously connected.

25. The computer system of claim 24, wherein the controller further detects when the external device is disconnected from the one port, and sends another control signal through the interface to the switching unit to disconnect the at least one additional power source from the one port and reconnect the at least one additional power source to the another port.

26. The computer system of claim 22, wherein the controller further detects when the external device is disconnected from the one port, and sends another control signal through the interface to the switching unit to disconnect the at least one additional power source from the one port.

27. The computer system of claim 22, wherein the controller further selects as the additional power source one of the power sources which is not providing power to any of the ports prior to being connected to the one port.

28. The computer system of claim 27, wherein the controller, prior to selecting the additional power source, detects that the additional power source is providing power to another one of the ports to power another external device, sends a request through the interface to discontinue providing the power to the another external device through the another one of the ports, and when the additional power source is no longer providing the power to the another external device in response to the sent request, selects the additional power source.

* * * * *